Aug. 4, 1925.
S. SZCZYGIEL
1,548,492
AUTOMOBILE SAFETY FENDER
Filed March 26, 1925
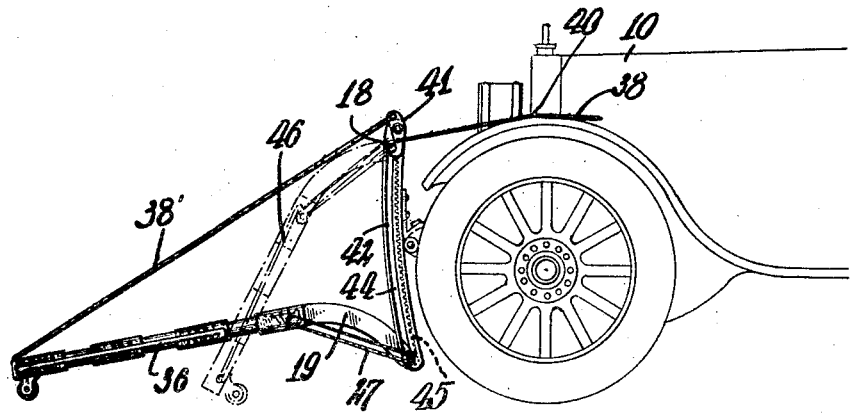
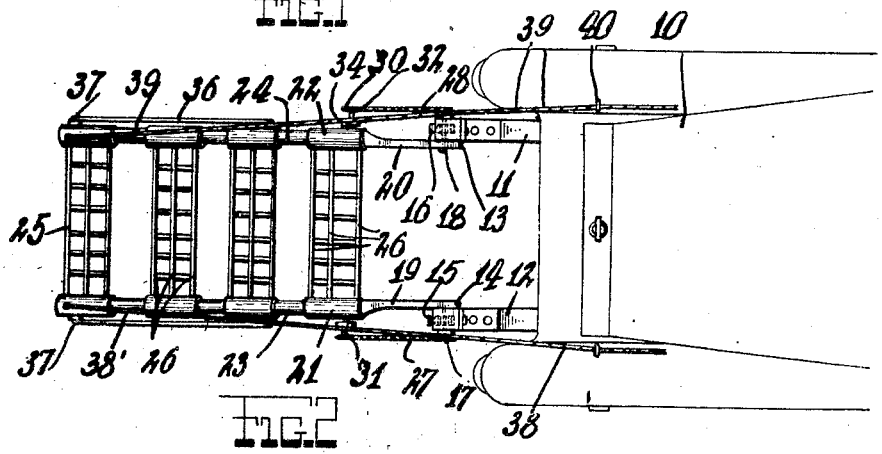
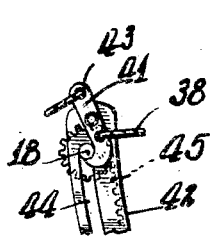
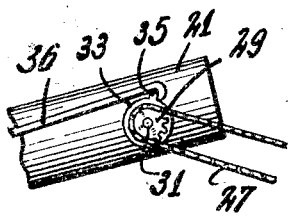
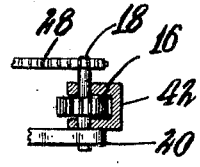
INVENTOR.
Stanislaw Szczygiel
BY
ATTORNEYS.

Patented Aug. 4, 1925.

1,548,492

UNITED STATES PATENT OFFICE.

STANISLAW SZCZYGIEL, OF GILBERTVILLE, MASSACHUSETTS.

AUTOMOBILE SAFETY FENDER.

Application filed March 26, 1925. Serial No. 18,388.

*To all whom it may concern:*

Be it known that I, STANISLAW SZCZYGIEL, a citizen of the United States, residing at Gilbertville, in the county of Worcester and State of Massachusetts, have invented certain new and useful Improvements in Automobile Safety Fenders, of which the following is a specification.

This invention relates to improvements in fenders, particularly automobile fenders, and it is the principal object of the invention to provide a telescoping fender adapted to be operated from the driver's seat to catch a person in the path of the vehicle and to prevent injury and death of this person.

Another object of the invention is the provision of a telescoping fender which is normally locked in its telescoped position to take up a comparatively small space.

A further object of the invention is the provision of an automobile fender of simple and inexpensive construction, yet effective and positive in its operation.

These and other objects of my invention will become more fully known, as the description proceeds, and will then be specifically pointed out in the appended claims.

Fig. 1 is a fragmentary side elevation of a car equipped with a fender constructed according to the invention.

Fig. 2 is a top plan view thereof.

Fig. 3 is a detail side elevation of a holding member for holding the fender in its normal position of rest.

Fig. 4 is a detail side elevation of a locking element on the fender.

Fig. 5 is a fragmentary top elevation of a locking element.

A car 10 has to the front part of its frame attached the bars 11 and 12 carrying the brackets 13 and 14 in the recessed front parts of which gears 15 and 16 are journaled on stub shafts 17 and 18 projecting over the lateral faces of the brackets and having secured thereto at the outer face of the same the inner end of curved holding members or elements 19 and 20, carrying at their opposite ends the sleeves 21 and 22 into which telescope the side bars 23 and 24 respectively of the fender generally designated 25, and consisting of a plurality of sleeves and bars telescoping therein. The sleeves of the fender are interconnected by means of flexible elements 26, for instance as shown, three for each pair of sleeves. Suitable flexible cross connections for the sets of elements 26 may be provided which do not hinder the telescoping operations.

At the outer ends of shafts 17 and 18 sprocket wheels are attached, over which chains 27 and 28 are guided, which are also guided over sprocket wheels 29 and 30 on shafts 31 and 32 projecting from the side faces of the uppermost pair of sleeves 21 and 22. The shafts 31 and 32 carry also discs 33 and 34 each having a tooth 35 in its periphery. Each tooth is adapted to be engaged by the hook end of a bar 36, the other end of which is secured to the lateral outer face of the lowermost pair of sleeves 21 and 22 as at 37.

Cables or the like, 38 and 39, are secured at their outer ends in the upper faces of the lowermost pair of sleeves and are guided through suitable eyes 40 to the seat of the driver or operator.

Cables 38, and 39, are each made in two sections, 38' and 39', and the ends of the inner sections are attached to pawls 41, pivotally secured intermediate their ends, to the upper ends of segmental bars 42, having their lower ends attached to the curved bars 19 and 20 of the fender. One end of pawls 41 has attached thereto the other sections of the cables, as at 43, while the other ends of the pawls are hook-shaped and grip over the shafts 18 and 19 as shown in Fig. 3.

The shafts are adapted to execute an up and down movement in the slots 44 of bars 42 while the wheels 15 and 16, on said shafts engage racks 45 formed with bars 42.

The operation of the device is as follows:

In its position of rest, the fender is telescoped and the cables 38 and 39 drawn in by the operator to hold the fender in its inclined and elevated positions indicated in dotted lines 46 in Fig. 1.

If danger of colliding with a person, etc., arises, the driver operates the cables to disengage the hooks of rods 36, from the tooth 35, so that the fender will swing into its operating or catch position shown in full in lines in Fig. 1.

The wheels 15 and 16 will glide over their shafts within the slots 44 to the upper ends of bars 42 and will be held in this position until the fender is to be returned to its normal folded or telescoped position.

It will be clear that changes may be made in the general arrangement and in the construction of the minor details of my invention without departure from the scope of the invention as defined in the appended claims.

Having thus described my invention, what I claim as new and desire to secure by Letters Patent, is:

1. Automobile fender comprising a pair of brackets adapted to be attached to a car, a pair of segmental slotted and toothed bars held by said brackets, shafts displaceably located in the slots of said bars, gears in said shafts engaging the teeth of said bars, means for locking said shafts and gears in their uppermost position, a telescoping fender, and means secured to said fender for operating said locking means, and a means for locking the fender parts in their telescoped positions.

2. In a car fender, a plurality of side sleeves, a plurality of rods or bars telescoping into said sleeves, stub shafts secured on said sleeves, discs on said shafts, a tooth on each of said discs, means for rotating said discs and rods having hooked ends adapted to engage or grip over the teeth of said discs for locking said telescoping sections of the fender in their telescoped position, allowing an instantaneous release.

3. A car fender comprising a fender composed of a plurality of telescoping sections, sectional cables controlled by the operator of the car for telescoping said sections and guiding the fender into normal inclined position in front of the car, means for locking the parts in their telescoped position, and means operated by one pair of said cable sections to release said locking means for allowing an extension of the fender and its bars to catch a person in the path of the vehicle.

In testimony whereof I have affixed my signature.

STANISLAW SZCZYGIEL.